(12) United States Patent
Liou

(10) Patent No.: US 7,403,613 B2
(45) Date of Patent: Jul. 22, 2008

(54) HOLDER FOR SUPPORTING OBJECTS IN VEHICLE

(75) Inventor: Chii Moon Liou, Chong Ho (TW)

(73) Assignee: Haicom International Co., Ltd., Gien Kang Chong Ho, Taipei Hsien (TW)

( * ) Notice: Subject to any disclaimer, the term of this patent is extended or adjusted under 35 U.S.C. 154(b) by 926 days.

(21) Appl. No.: 10/896,228

(22) Filed: Jul. 20, 2004

(65) Prior Publication Data

US 2006/0018464 A1    Jan. 26, 2006

(51) Int. Cl.
H04M 1/00    (2006.01)
H04M 9/00    (2006.01)

(52) U.S. Cl. .................. 379/455; 379/454; 379/446

(58) Field of Classification Search ............ 248/346.01, 248/346.06, 346.07, 371; 379/420.04, 426, 379/446, 449, 454, 455; 455/575.9
See application file for complete search history.

(56) References Cited

U.S. PATENT DOCUMENTS

| | | | |
|---|---|---|---|
| 4,797,916 A * | 1/1989 | Kojima | 379/454 |
| 5,187,744 A | 2/1993 | Richter | 379/449 |
| 5,392,350 A * | 2/1995 | Swanson | 379/446 |
| 5,555,302 A | 9/1996 | Wang | 379/446 |
| 5,790,661 A | 8/1998 | Patterson | 379/446 |
| 6,439,530 B1 * | 8/2002 | Schoenfish et al. | 248/346.06 |
| 6,840,487 B2 * | 1/2005 | Carnevali | 248/346.06 |

* cited by examiner

Primary Examiner—Curtis Kuntz
Assistant Examiner—Phylesha L Dabney
(74) Attorney, Agent, or Firm—Charles E. Baxley

(57) ABSTRACT

A holder device includes a base having an opening formed in a board, a seat received in the base and having a bracket attached to a panel, to form a channel between the bracket and the panel. The channel of the bracket is aligned with the opening of the board. A retainer is rotatably secured to a stand with a pivot shaft, and adjustable relative to the stand, and a housing is attached onto the retainer, and including a chamber formed therein for receiving an object therein. The stand is engageable into the channel that is formed or defined between the bracket and the panel, via the opening of the board. The board includes a front bag to receive a receiver device.

12 Claims, 6 Drawing Sheets

HOLDER FOR SUPPORTING OBJECTS IN VEHICLE

BACKGROUND OF THE INVENTION

1. Field of the Invention

The present invention relates to a holder device, and more particularly to a holder device for stably supporting various objects in vehicles.

2. Description of the Prior Art

Various kinds of typical supporter devices or holder devices have been developed for holding or supporting various objects in vehicles, such as mobile phones or portable phones, or the like, and comprise a holder plate or bracket for receiving or supporting the objects.

For example, U.S. Pat. No. 5,187,744 to Richter discloses one of the typical supporter devices or holder devices comprising a holder plate or bracket pivotally attached to a lower mount plate with a universally adjustable mounting device, to receive and to adjustably support the objects in vehicles or the like. However, the typical supporter devices or holder devices are required to be solidly attached or secured to the vehicles with screws or fasteners.

U.S. Pat. No. 5,555,302 to Wang discloses another typical supporter device or holder device also comprising a holder plate or bracket having a pair of slidable clamping plates movable toward or away from each other, to receive and to adjustably clamp and support the objects in vehicles or the like. However, similarly, the typical supporter device or holder device is also required to be solidly attached or secured to the vehicles with screws or fasteners.

U.S. Pat. No. 5,790,661 to Patterson discloses a further typical supporter device or holder device also comprising a cradle rotatably or pivotally attached to a lower mount plate for receiving or supporting the objects in vehicles or the like. However, similarly, the lower mount plate of the typical supporter device or holder device is also required to be solidly attached or secured to the vehicles with screws or fasteners.

The present invention has arisen to mitigate and/or obviate the afore-described disadvantages of the conventional supporter or holder devices.

SUMMARY OF THE INVENTION

The primary objective of the present invention is to provide a holder device for stably supporting various objects in vehicles.

The other objective of the present invention is to provide a holder device for adjustably supporting various objects in vehicles.

In accordance with one aspect of the invention, there is provided a holder device comprising a base including a board having an opening formed therein, a seat received in the base, and including a panel, and a bracket attached to the panel, to form a channel between the bracket and the panel, the channel being aligned with the opening of the board, a retainer rotatably secured to a stand with a pivot shaft, and adjustable relative to the stand, and a housing attached onto the retainer, and including a chamber formed therein for receiving an object therein. The stand is engageable into the channel that is formed or defined between the bracket and the panel, via the opening of the board.

The panel of the seat includes at least one peg extended therefrom, the bracket includes at least one aperture formed therein to receive the peg, and to anchor the bracket to the panel. The panel of the seat includes at least one catch extended therefrom and engageable with the bracket, to anchor the bracket to the panel.

The bracket includes two side flaps engaged onto the panel, and an intermediate board upwardly extended from the side flaps, to form the channel between the board and the panel. The seat may further include a pad or a magnetic member secured to the panel.

The base includes a bottom plate attached to bottom of the board, to retain the seat between the board and the bottom plate. The board includes at least one protuberance extended upwardly therefrom, to form a space therein.

The board includes a front portion having a bag attached thereto. The bag may include a zipper device to open and close the bag. A receiver device may further be provided and receivable in the bag, for receiving signals from satellites. The base includes a rear tube having an orifice formed therein, the receiver device includes a coupler coupled thereto and received in the rear tube.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
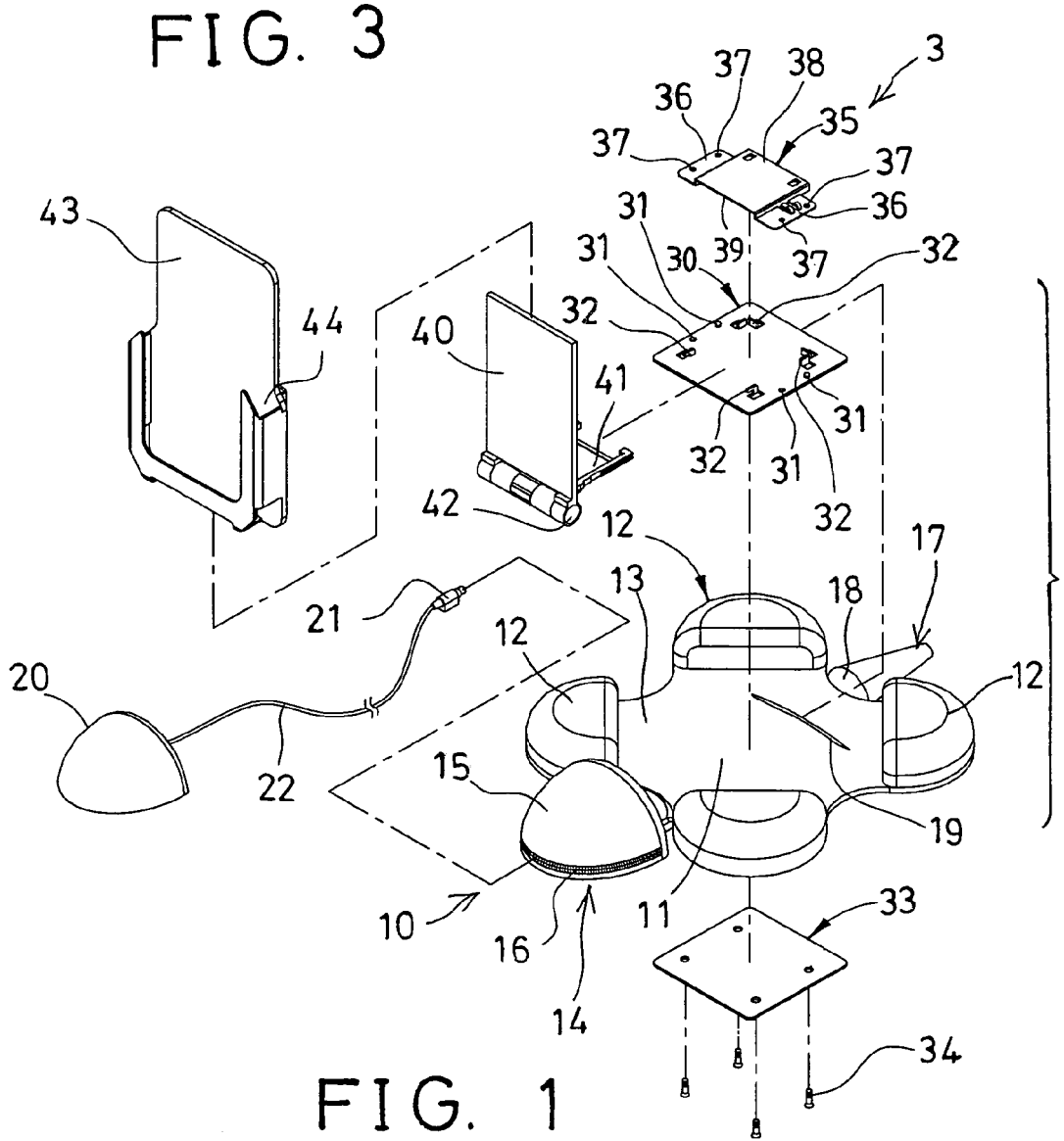
FIG. 1 is an exploded view of a holder device in accordance with the present invention.
Figure 2:
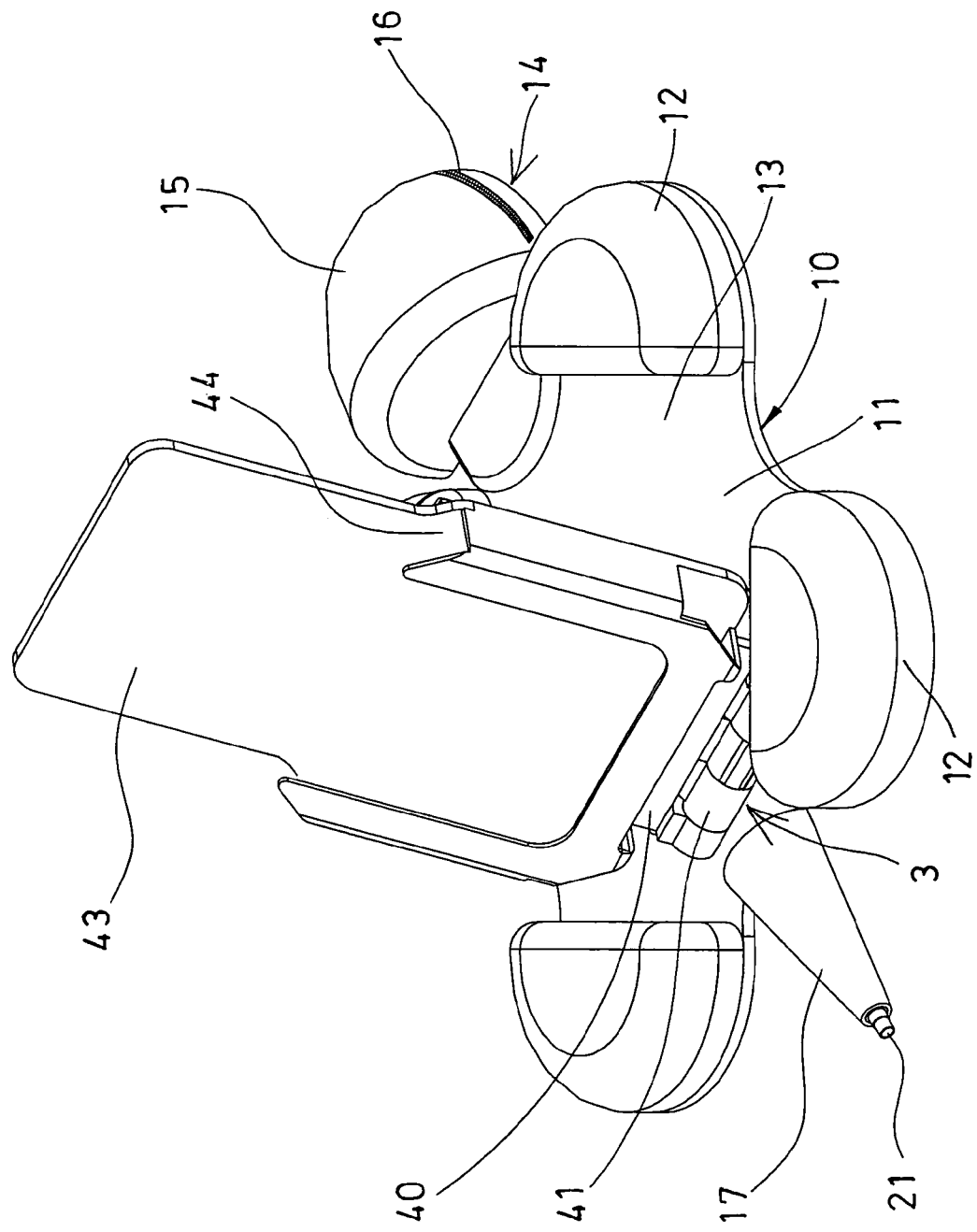
FIG. 2 is a perspective view of the holder device.
Figure 4:
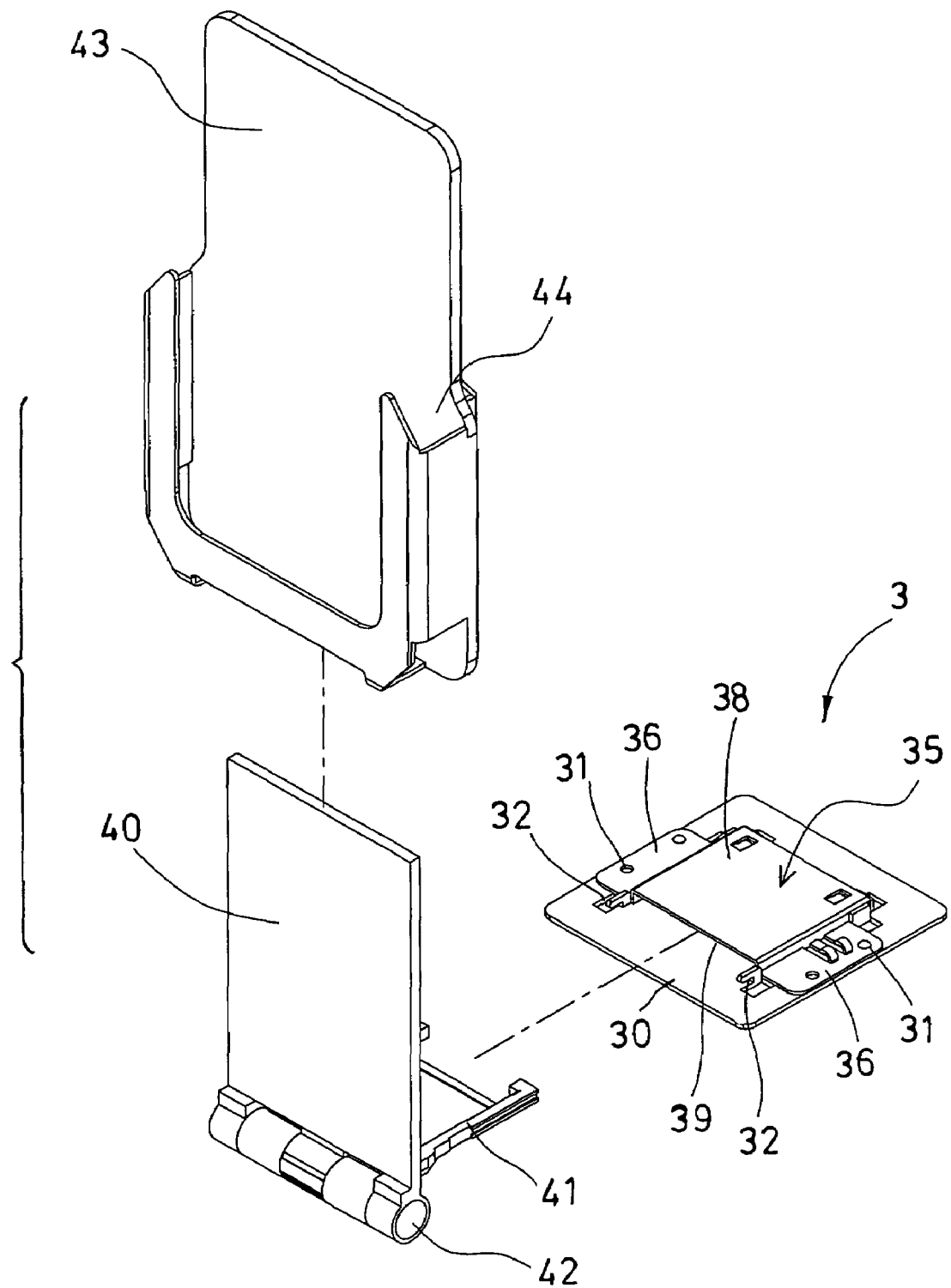
FIG. 4 is a partial exploded view illustrating an adjustable supporting device of the holder device.

Referring to the drawings, and initially to FIGS. 1 and 2, a holder device in accordance with the present invention comprises a base 10 including a board 11 having one or more protuberances 12 extended upwardly from outer peripheral portion thereof, to form or define a space 13 therein, and including a front portion 14 having a bag 15 attached thereto or provided therein. The bag 15 includes a zipper device 16 for opening or closing the bag 15.

Figure 5:
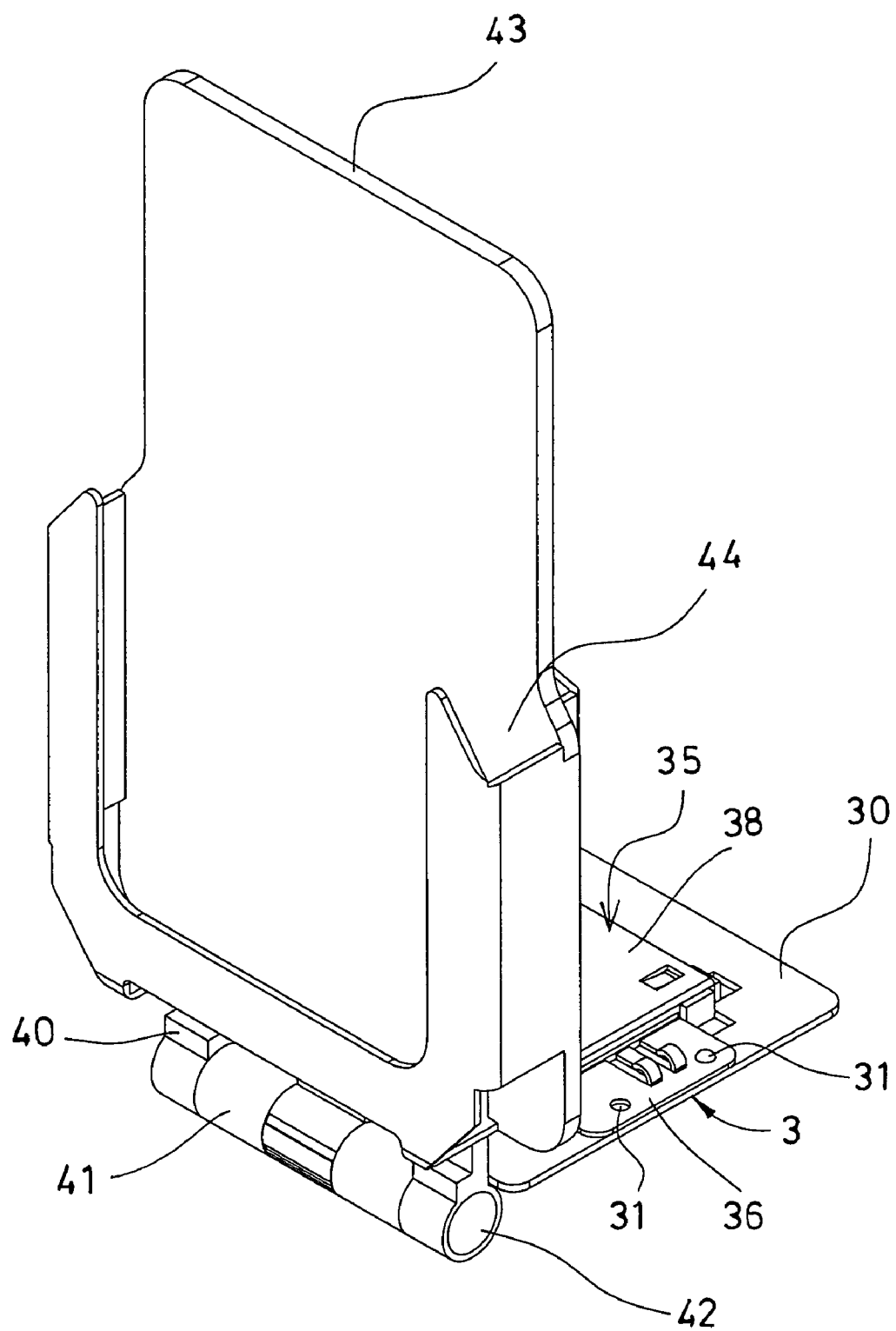
FIG. 5 is a perspective view of the adjustable supporting device of the holder device as shown in FIG. 4.
Figure 6:
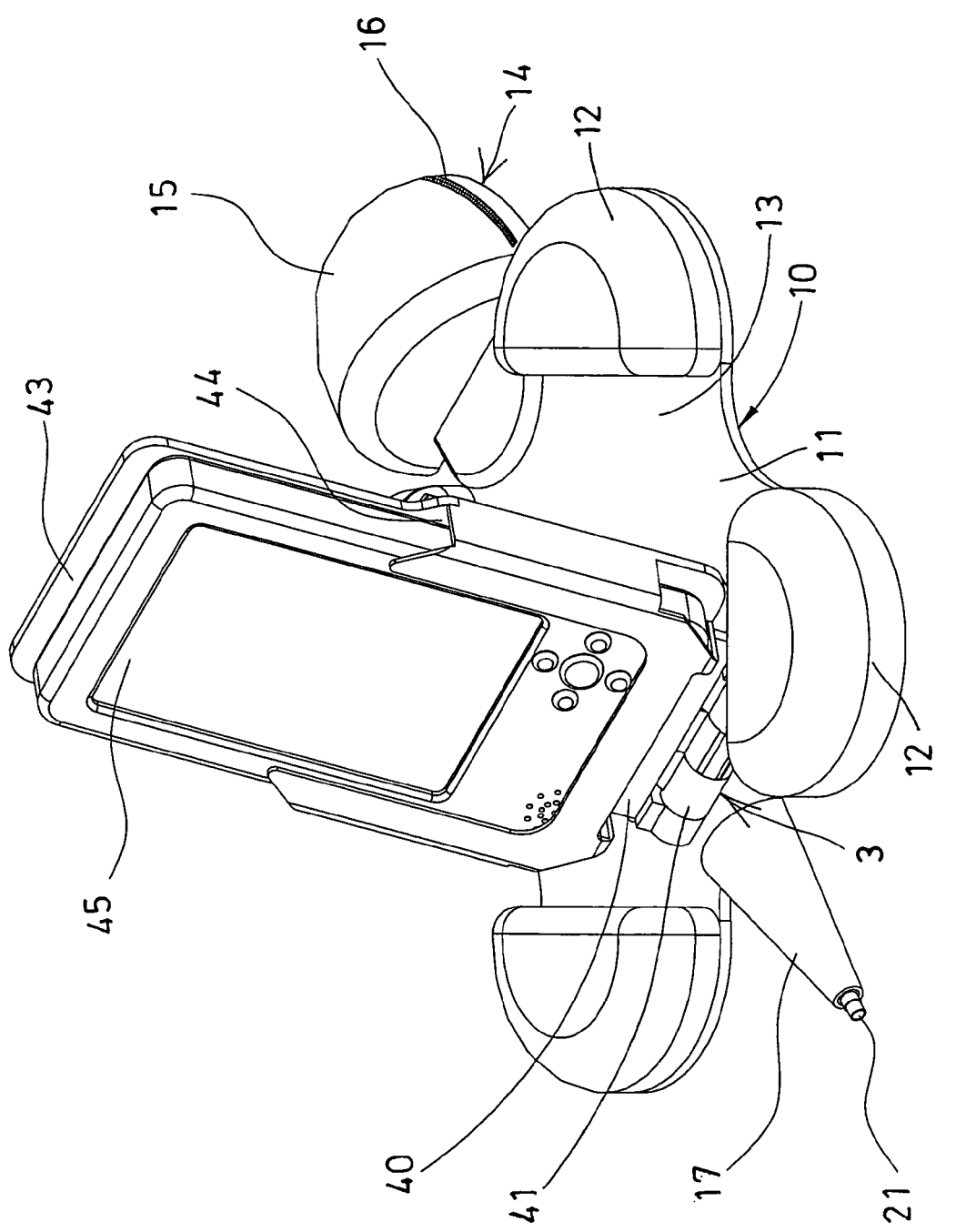
FIG. 6 is a perspective view similar to FIG. 2, illustrating the operation of the holder device.
Figure 7:
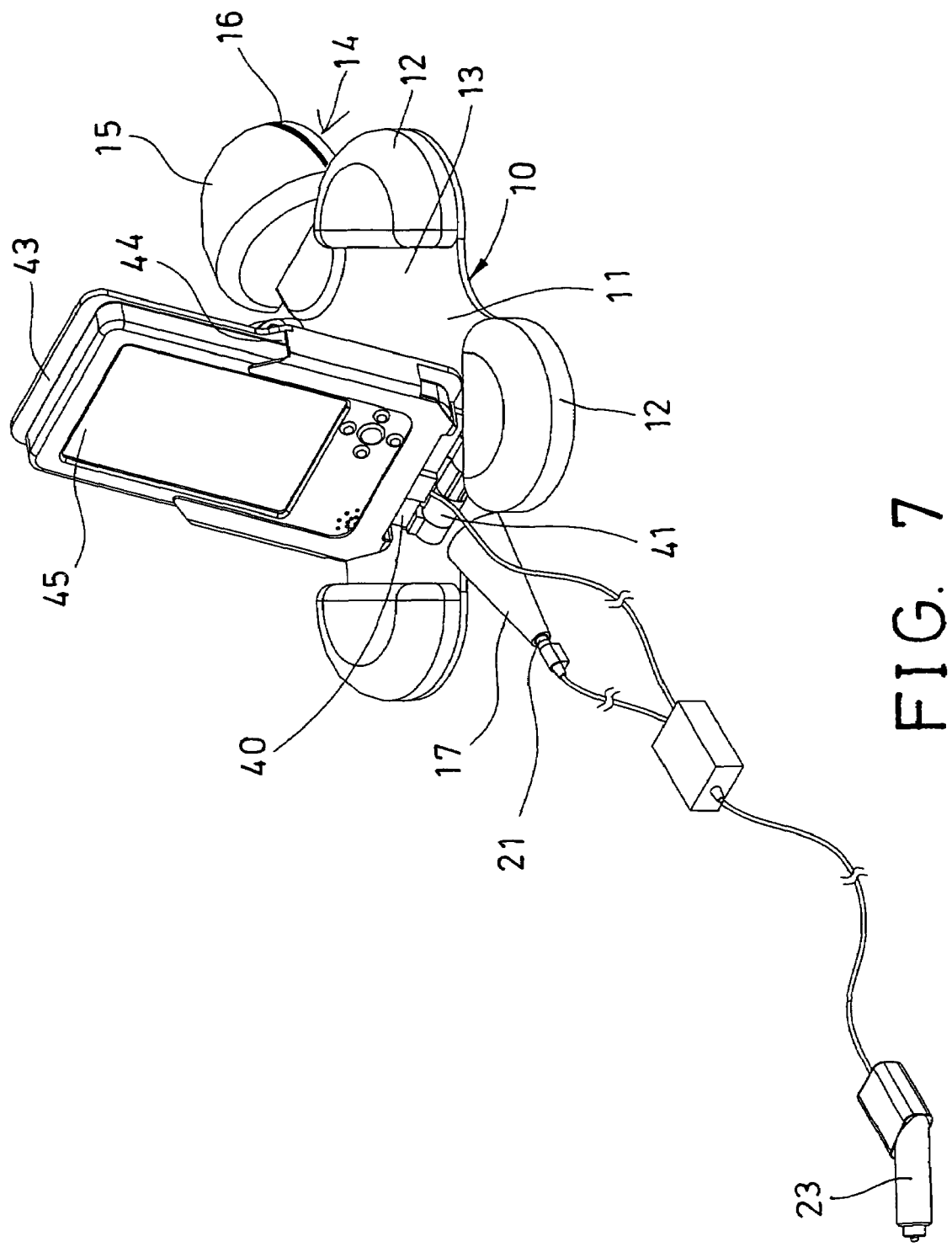
FIG. 7 is a perspective view similar to FIGS. 2 and 6, illustrating the coupling of the holder device to an electric power supplier for vehicles.

A receiver device 20, such as a satellite receiver device 20 may be received in the bag 15, for receiving signals from satellites (not shown) or the like. The base 10 includes a rear tube 17 having an orifice 18 formed therein, to receive a plug or a coupler 21 which may be coupled to the receiver device 20 with a cable 22, and which may be partially exposed out of the rear tube 17 (FIGS. 5-7), for coupling to electric power suppliers of vehicles via another plug or coupler 23 (FIG. 7).

Figure 3:
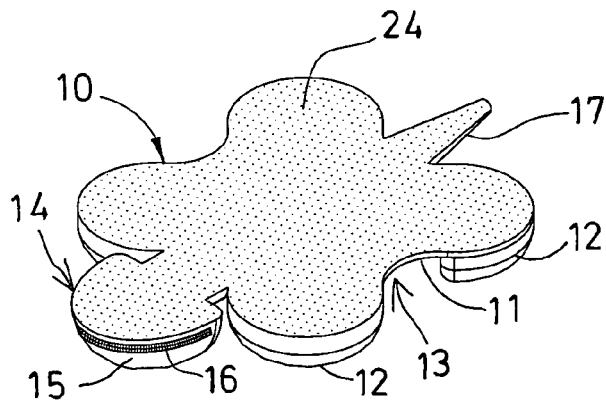
FIG. 3 is a bottom perspective view illustrating a base of the holder device.

The base 10 includes a bottom plate 24 (FIG. 3) attached to bottom of the board 11, and having a serrated or rough outer surface, for being stably disposed in various portions of the vehicles, the base 10 thus includes a pocket or compartment defined between the bottom plate 24 and the board 11, and includes a slit or an opening 19 formed in the board 11 (FIG. 1), for entering into the pocket or the compartment defined between the bottom plate 24 and the board 11.

A seat 3 is received in the base 10 and includes a panel 30 engageable into the pocket or compartment defined between the bottom plate 24 and the board 11, via the opening 19 formed in the board 11, or before the bottom plate 24 is secured to the board 11. The panel 30 includes one or more pegs 31 extended upwardly therefrom, and one or more spring catches 32 extended upwardly therefrom and preferably located beside the pegs 31 respectively. A pad or a magnetic member 33 may further be secured to bottom of the panel 30 with fasteners 34 for attracting or positioning the seat 3 and thus the holder device to metallic portions of the vehicles.

The seat 3 further includes a bracket 35 having two side flaps 36 engaged onto the panel 30, and each of the side flaps 36 includes one or more apertures 37 formed therein to receive the pegs 31, and to anchor or position the bracket 35 to the panel 30. The bracket 35 includes an intermediate board 38 upwardly extended from the side flaps 36, to form or define a channel 39 between the board 38 or the bracket 35 and the panel 30, in which the channel 39 of the bracket 35 is aligned with the opening 19 formed in the board 11. The spring catches 32 may be engaged with the bracket 35, to latch or secure the bracket 35 to the panel 30.

A retainer 40 is rotatably or adjustably secured to a stand 41 with a pivot shaft 42, and adjustable relative to the stand 41 to any suitable or selected angular position with ratchet mechanisms (not shown) or the like. The stand 41 may be engaged into the pocket or compartment defined between the bottom plate 24 and the board 11, via the opening 19 formed in the board 11, and may then be engaged into the channel 39 formed or defined between the board 38 and the panel 30.

A housing 43 may then be engaged or plugged or attached onto the retainer 40, and includes a chamber 44 formed therein for receiving various objects 45 therein (FIGS. 6, 7), such as mobile phones or portable phones, personal digital assistants (PDA), electrical maps, general purposes radar (GPS), or the like. The objects 45 may be rotated or adjusted relative to the stand 41 to any suitable or selected angular position with the retainer 40.

Accordingly, the holder device in accordance with the present invention may be used for stably and/or for adjustably supporting various objects in vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A holder device for holding portable electronic devices in a vehicle comprising: a base including a board having an opening formed therein, a seat received in said base, and including a panel, and a bracket attached to said panel, to form a channel between said bracket and said panel, said channel being aligned with said opening of said board, a retainer rotatably secured to a stand with a pivot shaft, and adjustable relative to said stand, and a housing attached onto said retainer, and including a chamber formed therein for receiving an object therein, and said stand being engageable into said channel defined between said bracket and said panel, via said opening of said board.

2. The holder device as claimed in claim 1, wherein said panel of said seat includes at least one peg extended therefrom, said bracket includes at least one aperture formed therein to receive said at least one peg, and to anchor said bracket to said panel.

3. The holder device as claimed in claim 1, wherein said panel of said seat includes at least one catch extended therefrom and engageable with said bracket, to anchor said bracket to said panel.

4. The holder device as claimed in claim 1, wherein said bracket includes two side flaps engaged onto said panel, and an intermediate board upwardly extended from said side flaps, to form said channel between said board and said panel.

5. The holder device as claimed in claim 1, wherein said seat includes a pad secured to said panel.

6. The holder device as claimed in claim 1, wherein said seat includes a magnetic member secured to said panel.

7. The holder device as claimed in claim 1, wherein said base includes a bottom plate attached to bottom of said board, to retain said seat between said board and said bottom plate.

8. The holder device as claimed in claim 1, wherein said board includes at least one protuberance extended upwardly therefrom, to form a space therein.

9. The holder device as claimed in claim 1, wherein said board includes a front portion having a bag attached thereto.

10. The holder device as claimed in claim 9, wherein said bag includes a zipper device to open and close said bag.

11. The holder device as claimed in claim 9 further comprising a receiver device receivable in said bag, for receiving signals from satellites.

12. The holder device as claimed in claim 11, wherein said base includes a rear tube having an orifice formed therein, said receiver device includes a coupler coupled thereto and received in said rear tube.

* * * * *